United States Patent Office 3,556,843
Patented Jan. 19, 1971

3,556,843
METALLIZED CERAMIC AND METHOD AND COMPOSITION THEREFOR
Robert W. Buck, Wheat Ridge, Colo., assignor to Coors Porcelain Company, Golden, Colo., a corporation of Colorado
No Drawing. Filed May 23, 1968, Ser. No. 731,607
Int. Cl. H01b 1/02, 1/06
U.S. Cl. 117—227                                                    8 Claims

ABSTRACT OF THE DISCLOSURE

Sintered beryllium oxide base ceramic is metallized by applying thereto a layer of a mixture of about 70 to 85% by weight tungsten powder and about 15 to 30% by weight yttrium oxide powder and then heating to a temperature sufficient to sinter the tungsten powder and cause the yttrium oxide to react with the beryllium oxide to form a liquid phase which penetrates and fills the interstices of the sintered tungsten to provide a strongly bonded metallized surface on the beryllium oxide ceramic to which other metals may then be easily bonded for forming electrical connections or to form a sealed structure.

---

The subject matter of the present invention is an improved composition and method for metallizing sintered beryllium oxide base ceramic, and the metallized ceramic article resulting therefrom.

For many applications of sintered metal oxide type ceramics, particularly for the electronics industry, it is necessary that the ceramic be provided with a strongly bonded metallized surface to which other metals can be bonded for the purpose of forming electrical connections or for forming seals with metal components or with other metallized ceramic components. For many of these applications it is much preferred to use beryllium oxide base ceramic instead of other more conventional ceramics such as sintered aluminum oxide, for one reason because of the extremely high thermal conductivity of beryllium oxide base ceramic which enables rapid conduction and dissipation of heat. Numerous metallizing compositions and methods have been proposed and are currently available; however, none is fully adequate to provide a strongly bonded metallized surface on beryllium oxide base ceramic without dependency on the presence of silica or other additives in the ceramic which additives are otherwise unnecessary and often disadvantageous. With the present invention excellent metallized surfaces can be formed on ceramics consisting entirely or substantially entirely of sintered beryllium oxide as well as on sintered beryllium oxide base ceramics containing a lesser percentage of beryllium oxide together with additives, as will hereinafter be described.

The metallizing composition of the present invention consists essentially of a mixture of from about 70 to 85% by weight tungsten metal and from about 15 to 30% by weight yttrium oxide ($Y_2O_3$). The preferred mixture is 80% by weight tungsten and 20% by weight yttrium oxide. Such mixture is prepared by uniformly mixing the two ingredients in powdered form, preferably by milling in a ball mill. For application to the ceramic surface, the powdered mixture can be mixed and suspended into a suitable liquid vehicle preferably containing a temporary organic binder which can, for example, be any of a number of organic resins. The suspension can be aqueous or organic as desired. The following example is given by way of illustration rather than of limitation: tungsten powder (−325 mesh) 400 grams, yttrium oxide (−325 mesh) 100 grams, polymethylmethacrylate resin 10 grams, butyl carbitol 10 cc., xylene 190 cc. This mixture, including the organic ingredients, is then ball milled for about 70 hours to further reduce the particle size of the tungsten and yttrium oxide powders and to assure a completely uniform mixture after which the resulting suspension is ready for application to the ceramic surface. Application to the ceramic surface can be, for example by brushing, spraying, silk screening or dipping. After the suspension is coated onto the ceramic surface the vehicle, here xylene and butyl carbitol, is caused to evaporate leaving the resin bonded mixture of tungsten and yttrium oxide powders on the beryllium oxide ceramic surface.

With the metallizing composition thus supplied, the beryllium oxide ceramic article is then heated to a temperature above 1580° C. and preferably from 1580° C. to 1680° C. in a reducing or inert atmosphere, preferably hydrogen or a mixture of hydrogen and nitrogen, during which heating the yttrium oxide reacts with the beryllium oxide to form a liquid phase reaction product of yttrium oxide and beryllium oxide at the ceramic-metal interface. Simultaneously the tungsten particles sinter together to form a sponge-like structure whereupon the aforesaid liquid phase reaction product penetrates into the interstices of the sintered tungsten powder to provide upon cooling and solidification a strongly bonded tungsten metallized surface on the beryllium oxide ceramic, the reaction product of the yttrium oxide and beryllium oxide provides a monolithic structure with the beryllium oxide base ceramic. The weight of the tungsten in the final structure will be about 2.3 to 5.7 times the weight of the yttria in the yttria-beryllia reaction product and, in the preferred embodiment, the weight of the tungsten is about 4 times the weight of the yttrium oxide. Other metals, for example nickel, copper or gold, can then be easily deposited on and bonded to the tungsten metallized surface by plating or the like. Where brazed connections are to be made it is best to deposit such other metal to provide an overlayer and then braze to this overlayer.

By the term "beryllium base ceramic" as used herein is meant ceramic consisting substantially entirely or at least predominantly of beryllium oxide. From the standpoint of high thermal conductivity, the higher the percentage of beryllium oxide the better, though the physical strength and other characteristics of such ceramic are generally enhanced by the addition of small amounts of glass forming or mineralizer ingredients to reduce the sintering temperature, control crystal growth during firing and optimize densification during sintering. Typical of the additives used are silica either as such or in its combined forms, such as clay or talc, the alkaline earth metal oxides such as magnesia or calcia, or other metal oxides such as chromium oxide, manganese oxide or the like. The following are typical compositions for beryllium oxide base ceramics: 100% beryllium oxide; 99.5% by weight beryllium oxide, .5% by weight $MgO_2$; 96% by weight beryllium oxide, 3% by weight silica and 1% by weight calcia. Such ceramics are manufactured by uniformly mixing the ingredients in powdered form, generally with a small amount of organic binder, to form a raw batch, forming the raw batch into shaped articles and then firing to burn out the binder and sinter the ceramic. Sintering temperatures of from about 1550° C. to 1800° C. can be used for the sintering operation, the exact temperature depending upon the precise composition being fired. Such ceramics are well known in the art and are commonly available in the market.

As alluded to above, whereas the metallizing composition of this invention can be effectively used on ceramics containing a substantial amount of silica, which in turn, means a lower percentage of beryllium oxide, its chief advantage is for metallizing beryllium oxide ceramics containing very little or no silica since it is such ceramic which cannot be metallized to the same standard of quality with known metallizing compositions.

It will be understood that while the invention has been described specifically with reference to a preferred embodiment thereof, various changes and modifications may be made all within the full and intended scope of the claims which follow.

The embodiments of the invention in which an exclusive property or privilege is claimed are defined as follows:

1. A metallizing composition particularly suited for metallizing beryllium oxide base ceramic, said composition consisting essentially of from about 70% to 85% by weight tungsten and 15% to 30% by weight yttrium oxide.

2. A composition as set forth in claim 1 consisting essentially of about 80% by weight tungsten and about 20% by weight yttrium oxide.

3. A method for metallizing beryllium oxide base ceramic comprising the step of applying to a surface of the ceramic a mixture of from about 70% to 85% by weight tungsten powder and 15% to 30% by weight yttrium oxide, and then heating the ceramic to a temperature above 1550° C.

4. A method as set forth in claim 2 wherein the ceramic is heated to a temperature of from 1575° C. to 1675° C.

5. A method as set forth in claim 3 wherein said mixture contains 80% by weight tungsten and 20% by weight yttrium oxide.

6. A metallized ceramic article comprising a beryllium oxide base ceramic body having on its surface a layer of sintered tungsten powder which is bonded to said body by a reaction product of yttrium oxide and beryllium oxide which forms a monolithic structure with said body, the weight of the tungsten being from about 2.33 to 5.66 times the weight of the yttrium oxide in said reaction product.

7. A metallized ceramic article as set forth in claim 6 wherein said sintered tungsten powder layer is porous and wherein said reaction product of yttrium oxide and beryllium oxide penetrates into the interstices of said sintered tungsten powder layer.

8. A metallized ceramic as set forth in claim 6 wherein the weight of the tungsten is about 4 times the weight of the yttrium oxide in said reaction product.

References Cited

UNITED STATES PATENTS 2,902,756  9/1959  Cavanaugh _____ 117—227X
3,290,171  12/1966  Zollman et al. _____ 117—227X WILLIAM L. JARVIS, Primary Examiner U.S. Cl. X.R.

106—1; 117—118, 160; 252—515, 521